US012591035B2

(12) United States Patent (10) Patent No.: US 12,591,035 B2
Weksler et al. (45) Date of Patent: Mar. 31, 2026

(54) DETECTION OF DEVICE PROVIDING AUDIBLE NOTIFICATION AND PRESENTATION OF ID/LOCATION OF DEVICE IN RESPONSE

(71) Applicant: Lenovo (Singapore) Pte. Ltd., Singapore (SG)

(72) Inventors: Arnold Weksler, Raleigh, NC (US); John C. Mese, Cary, NC (US); Nathan Peterson, Oxford, NC (US); Russell Speight VanBlon, Raleigh, NC (US); Mark Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 199 days.

(21) Appl. No.: 17/555,102

(22) Filed: Dec. 17, 2021

(65) Prior Publication Data

US 2023/0194654 A1 Jun. 22, 2023

(51) Int. Cl.
*G01S 5/20* (2006.01)
*G08B 3/10* (2006.01)
*G08B 17/10* (2006.01)
*G08B 21/14* (2006.01)
*H04R 1/40* (2006.01)

(52) U.S. Cl.
CPC ................. *G01S 5/20* (2013.01); *G08B 3/10* (2013.01); *G08B 17/10* (2013.01); *G08B 21/14* (2013.01); *H04R 1/406* (2013.01)

(58) Field of Classification Search
CPC . G01S 5/20; G01S 3/8083; G01S 3/80; G01S 3/00; H04R 1/406; H04R 3/005; G08B 3/10; G08B 17/10; G08B 21/14

USPC .......................................................... 367/129
See application file for complete search history.

(56) References Cited

U.S. PATENT DOCUMENTS

| | | | | |
|---|---|---|---|---|
| 8,861,310 | B1 * | 10/2014 | Karakotsios | .............. G01S 5/22 |
| | | | | 367/124 |
| 9,142,119 | B1 * | 9/2015 | Grant | ..................... G08B 25/10 |
| 9,213,659 | B2 * | 12/2015 | Beaumont | ................. G06F 3/00 |
| 2013/0053053 | A1 * | 2/2013 | Agarwal | ............... G06Q 90/20 |
| | | | | 367/118 |

(Continued)

OTHER PUBLICATIONS

Anupam et al. ("Do You Hear What I Hear? Fingerprinting Smart Devices Through Embedded Acoustic Components", In Proceedings of the 2014 Acm Sigsac Conference on Computer and Communications Security (CCS '14). Association for Computing Machinery, New York, NY, USA, 441-452.) (Year: 2014).*

(Continued)

*Primary Examiner* — Yuqing Xiao
*Assistant Examiner* — Christopher Richard Walker
(74) *Attorney, Agent, or Firm* — John M. Rogitz; John L. Rogitz

(57) ABSTRACT

In one aspect, a first device may include at least one processor and storage accessible to the at least one processor. The storage may include instructions executable by the at least one processor to receive input from at least one microphone, with the input indicating an audible notification from a second device different from the first device. The instructions may then be executable to, based on the input from the at least one microphone, provide an output indicating a location of the second device and/or an identifier of the second device.

20 Claims, 6 Drawing Sheets

(56) References Cited

U.S. PATENT DOCUMENTS

| 2013/0151200 | A1* | 6/2013 | Hui | F42B 12/365 |
| | | | | 702/188 |
| 2013/0237204 | A1* | 9/2013 | Buck | G01S 19/16 |
| | | | | 455/418 |
| 2014/0218194 | A1* | 8/2014 | Gruber | G08B 25/14 |
| | | | | 340/540 |
| 2015/0100167 | A1* | 4/2015 | Sloo | G08B 29/26 |
| | | | | 700/278 |
| 2015/0156637 | A1* | 6/2015 | Li | H04W 16/14 |
| | | | | 455/454 |
| 2015/0294545 | A1* | 10/2015 | Odette | G08B 7/06 |
| | | | | 340/628 |
| 2019/0297592 | A1* | 9/2019 | Lindquist | G01S 5/0236 |
| 2020/0219382 | A1* | 7/2020 | Kleve | G08B 25/012 |
| 2021/0365681 | A1* | 11/2021 | Huo | G06F 3/0346 |

OTHER PUBLICATIONS

Bajpai et al. ("Smart Phone as a Controlling Device for Smart Home Using Speech Recognition", International Conference on Communication and Signal Processing, Apr. 4-6, 2019) (Year: 2019).*
Kim et al. ("Deep Neural Network-Based Indoor Emergency Awareness Using Contextual Information From Sound, Human Activity, and Indoor Position on Mobile Device", IEEE Transactions on Consumer Electronics, vol. 66, No. 4, Nov. 2020) (Year: 2020).*

* cited by examiner

*400*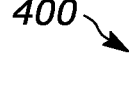
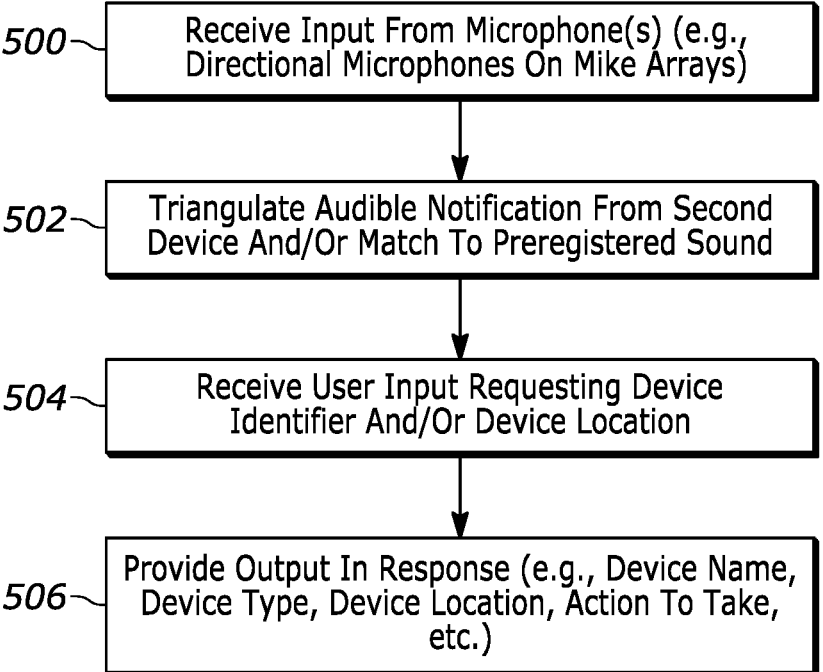
FIG. 4
500 — Receive Input From Microphone(s) (e.g., Directional Microphones On Mike Arrays)
502 — Triangulate Audible Notification From Second Device And/Or Match To Preregistered Sound
504 — Receive User Input Requesting Device Identifier And/Or Device Location
506 — Provide Output In Response (e.g., Device Name, Device Type, Device Location, Action To Take, etc.)
FIG. 5

600

700

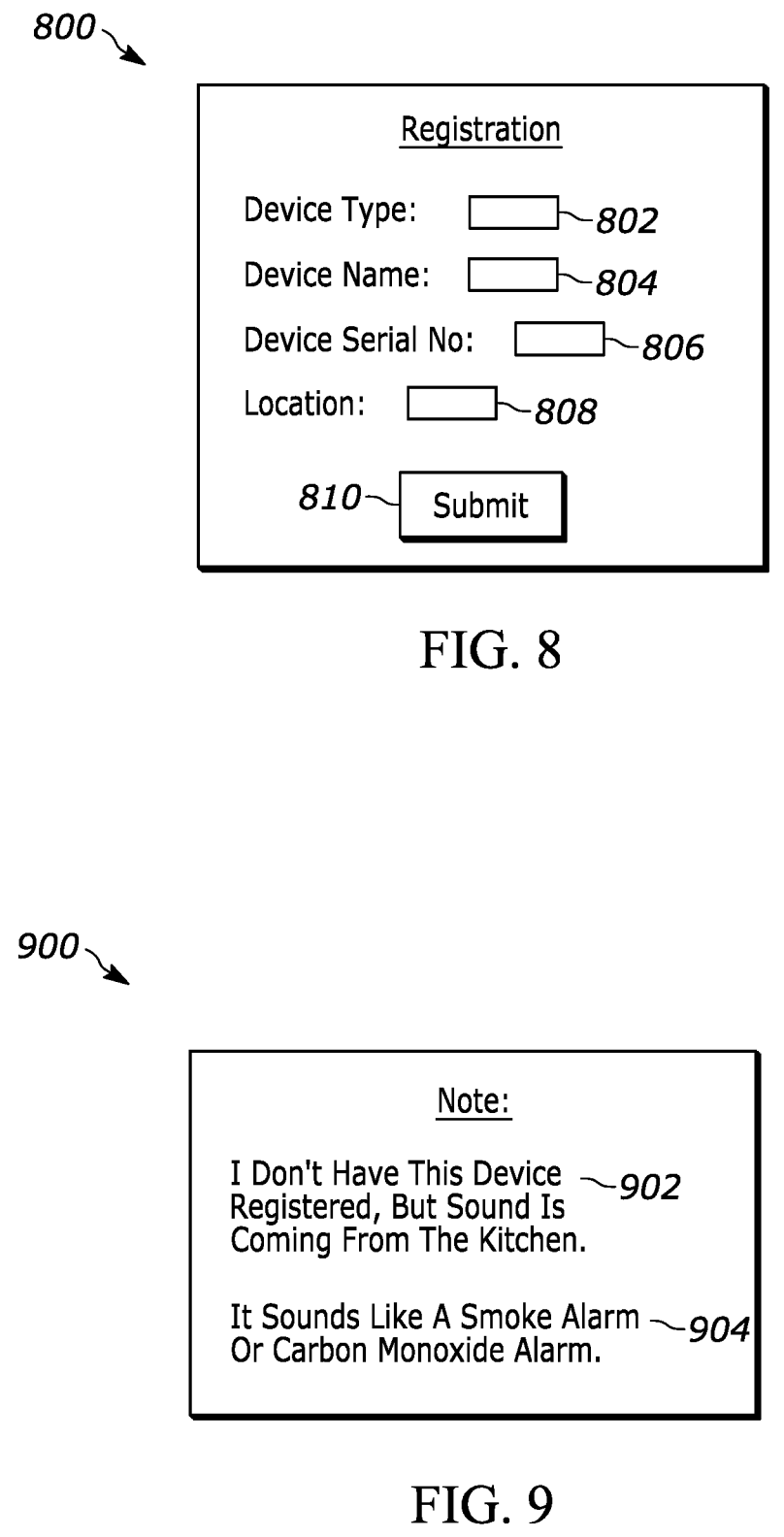

800

Registration

Device Type: ⬜ ~802

Device Name: ⬜ ~804

Device Serial No: ⬜ ~806

Location: ⬜ ~808

810~ Submit

Note:

I Don't Have This Device ~902
Registered, But Sound Is
Coming From The Kitchen.

It Sounds Like A Smoke Alarm ~904
Or Carbon Monoxide Alarm.

FIG. 9

DETECTION OF DEVICE PROVIDING AUDIBLE NOTIFICATION AND PRESENTATION OF ID/LOCATION OF DEVICE IN RESPONSE

FIELD

The disclosure below relates to technically inventive, non-routine solutions that are necessarily rooted in computer technology and that produce concrete technical improvements. In particular, the disclosure below relates to techniques for detecting a device providing an audible notification and presenting an identifier and/or location of the device in response.

BACKGROUND

As recognized herein, a device such as a smoke detector may provide an audible low-battery notification or an actual smoke alarm notification but owing to the smoke detector often being located in the same general area as other smoke detectors, people often have a difficult time identifying which smoke detector is providing the audible notification. This can make it difficult to determine which smoke detector should have its battery replaced or, in the case of an actual emergency, where a fire threat is actually occurring.

Moreover, in the case of devices other than smoke detectors, the present disclosure recognizes that the reason for the audible notification might not be readily appreciable to someone, and a user might have to figure out what the problem is with the device before addressing it. This can take an unnecessary amount of time and the present disclosure further recognizes that in some situations, this can also take technical expertise that the average person might not have.

What is more, and as also recognized herein, Internet of Things (IoT) devices might report a situation themselves over a network, but they often cannot report a low-battery situation when their batteries have reached a "critical" low battery state where network communications are cut off (even if an audible notification is still provided in that state). Additionally, even where network communications are not cut off, the present disclosure recognizes that network communication and maintaining a network presence can accelerate battery drain and cause further problems, and when the battery cannot provide any power anymore the user might not be notified at all.

There are currently no adequate solutions to the foregoing computer-related, technological problems.

SUMMARY

Accordingly, in one aspect a first device includes at least one processor and storage accessible to the at least one processor. The storage includes instructions executable by the at least one processor to receive input from at least one microphone, with the input indicating an audible notification from a second device different from the first device. The instructions are also executable to, based on the input from the at least one microphone, provide an output indicating a location of the second device.

In some example implementations, the output may also indicate an identifier of the second device, such as a device name and/or a device type associated with the second device. Also, if desired, in some examples the output may include an indication of an action to take in relation to the second device based on the audible notification.

Additionally, in some example embodiments the instructions may be executable to identify the second device based on the audible notification indicated in the input from the at least one microphone matching a preregistered sound accessible to the first device. In these embodiments, the instructions may then be executable to provide the output based on the identification.

Also in some example embodiments, the at least one microphone may include first and second directional microphones, and the instructions may be executable to receive input from the first and second directional microphones, triangulate the location of the second device based on the input from the first and second directional microphones, and provide the output based on the triangulation. In some examples, the first and second microphones may be microphones respectively located on third and fourth devices different from the second device. In these examples, the first device may be the same as one of the third and fourth devices or may itself be different as well.

In various example implementations, the audible notification may be a smoke alarm notification, and the second device may be a smoke detector. Or the audible notification may be a carbon monoxide alarm notification, and the second device may be a carbon monoxide detector.

Still further, in some examples the first device may include the at least one microphone itself.

In another aspect, a method includes receiving, at a first device, input from at least one microphone, with the input indicating an audible notification from a second device different from the first device. The method also includes providing an output indicating an identifier of the second device based on the input from the at least one microphone.

In various examples, the identifier may indicate a device name and/or a device type associated with the second device. If desired, the output may also indicate a location of the second device, such as by indicating a particular room in which the second device is disposed, as well as an indication of an action to take in relation to the second device to address the audible notification.

Still further, and also in various examples, the audible notification may be a low-battery notification, and the second device may be an uninterruptible power supply, an Internet of things (IoT) device, a digital assistant device, and/or a device not connected to a Wi-Fi network or other local area network.

In some example implementations, the method may include identifying the second device based on the audible notification indicated in the input matching a preregistered sound, and then providing the output based on the identifying.

Also in some example implementations, the at least one microphone may include first and second microphone arrays, and the method may include receiving input from the first and second microphone arrays, triangulating the location of the second device based on the input from the first and second microphone arrays, and providing the output based on the triangulating.

In still another aspect, at least one computer readable storage medium (CRSM) that is not a transitory signal includes instructions executable by at least one processor to receive, at a first device, user input requesting identification of a second device that is producing an audible notification and/or a location of the second device that is producing the audible notification. The instructions are also executable to receive input from at least one microphone, with the input indicating the audible notification. The instructions are then executable to, based on the user input and based on the input from the at least one microphone, provide an output indicating the identification and/or the location.

The details of present principles, both as to their structure and operation, can best be understood in reference to the accompanying drawings, in which like reference numerals refer to like parts, and in which:

BRIEF DESCRIPTION OF THE DRAWINGS

FIG. 4 is an example graphical user interface (GUI) that may be presented as an output to indicate a location and identity of an audible notification-emitting device consistent with present principles;

FIG. 5 illustrates example logic in example flow chart format that may be executed by a device consistent with present principles;

FIGS. 7 and 8 show example GUIs that may be used to register an audible notification and/or the emitting device itself consistent with present principles; and FIG. 9 shows another example GUI that may be presented as an output to indicate a location and potential identity of an audible notification-emitting device consistent with present principles.

DETAILED DESCRIPTION

Figure 1:
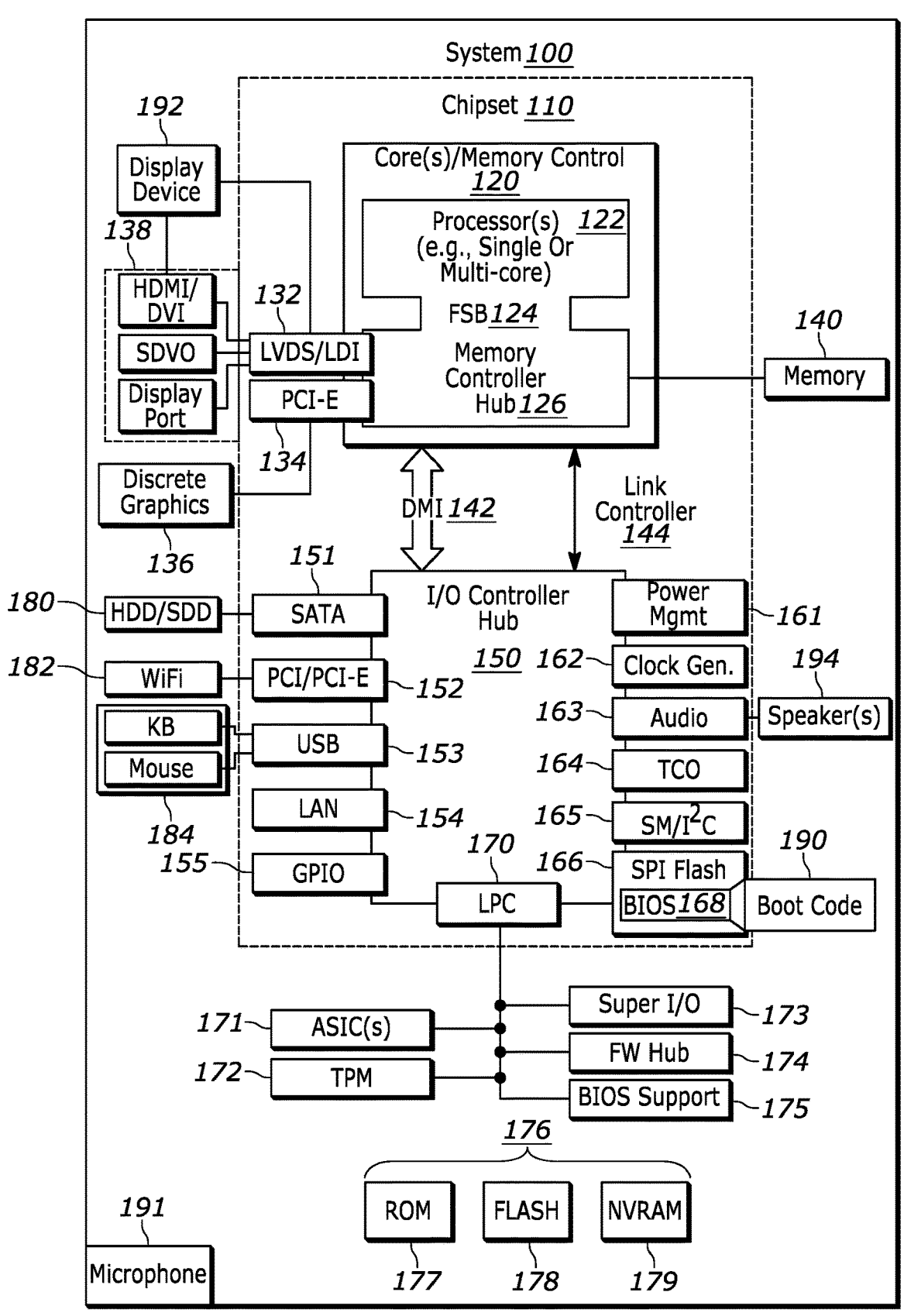
FIG. 1 is a block diagram of an example system consistent with present principles.

Among other things, the detailed description below discloses use of digital assistant devices and other smart devices that have microphone arrays having two or more directional microphones. Since many people have multiple smart devices that are on most of the time, these devices can be used to triangulate on the proximity of any other device that is alarming or notifying a user of issues. The sounds might include chirping, beeping, or other high pitch notifications for example. The user may thus ask the smart device to identify the location and type of device that is providing the notification.

The location and type of device can be ascertained in several ways. For example, each device can be registered by pressing the device's "test" button, e.g., in the case of smoke detectors, carbon monoxide detectors, and uninterruptible power supplies (UPSs) and other battery backups. The sound volume and location may then be captured by the smart devices that are capable of hearing the device notification. The user may then identify the device that just had its test button pressed to register it.

As another example, the smart devices might be able to access unique device notification sounds from a database and may thus be able to autonomously distinguish the type of device that is providing a given audible notification as well as what unique notification is being provided. The notification might be a low-battery notification, wiring fault notification, or any number of unique notifications.

As yet another example, the user can manually input the potential notification devices as well as their locations.

As still another example, if no information is made available/registered (e.g., by the end user themselves or even by a manufacturer), then the smart devices will use their own microphone arrays to triangulate the source of the device notifications and still provide location to the user when requested.

Thus, when an audible device notification is triggered, a user can ask a smart device to provide the location of the sound-emitting device, type of device, and possibly corrective action to silence the audible notification.

Further note that audible notifications consistent with present principles need not be limited smoke alarm beeps, carbon monoxide alarm beeps, or UPS device beeps. Other example audible notifications include car alarms and car horns, Internet of Things (IoT) device notifications, received message notifications (e.g., email receipt notification, SMS text message receipt notification, etc.), audible messages from another digital assistant device, audible messages from other devices not connected to a Wi-Fi network or other local area network, and many other types of audible notifications that might be provided.

Different audible notifications from the same device may also be differentiated consistent with present principles. For example, using the smoke detector again as an example, an audible low-battery notification may be distinguished from an audible fire/smoke alarm notification for an actual fire. An appropriate output may then be provided to a user depending on the type of notification.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, which are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a microphone and/or microphone array 191 that provides input from the microphone/array 191 to the processor 122 based on audio that is detected, such as an audible notification detected by the microphone/array 191 consistent with present principles. Note that if an array is used, the array may include plural directional microphones facing outward at various known directions/bearings.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100 (e.g., for triangulation in conjunction with another device consistent with present principles).

For example, the system may also include an ultra-wideband (UWB) transceiver for UWB communication and location tracking. The UWB transceiver may be configured to transmit and receive data using UWB signals and UWB communication protocol(s), such as protocols set forth by the FiRa Consortium. As understood herein, UWB may use low energy, short-range, high-bandwidth pulse communication over a relatively large portion of the radio spectrum. Thus, for example, an ultra-wideband signal/pulse may be established by a radio signal with fractional bandwidth greater than 20% and/or a bandwidth greater than 500 MHz. UWB communication may occur by using multiple frequencies (e.g., concurrently) in the frequency range from 3.1 to 10.6 GHz in certain examples. Thus, to transmit UWB signals consistent with present principles, the UWB transceiver may include one or more Vivaldi antennas and/or a MIMO (multiple-input and multiple-output) distributed antenna system, for example. It is to be further understood that various UWB algorithms, time difference of arrival (TDoA) algorithms, and/or angle of arrival (AoA) algorithms may be used for system 100 to determine the distance to and location of another UWB transceiver on another device that is in communication with the UWB transceiver on the system 100 to thus track the real-time location of the other device in relatively precise fashion. The orientation of the other device may even be tracked via the UWB signals.

It is to be understood that an example client device or other machine/computer may include fewer or more features than shown on the system 100 of FIG. 1. In any case, it is to be understood at least based on the foregoing that the system 100 is configured to undertake present principles.

Figure 2:
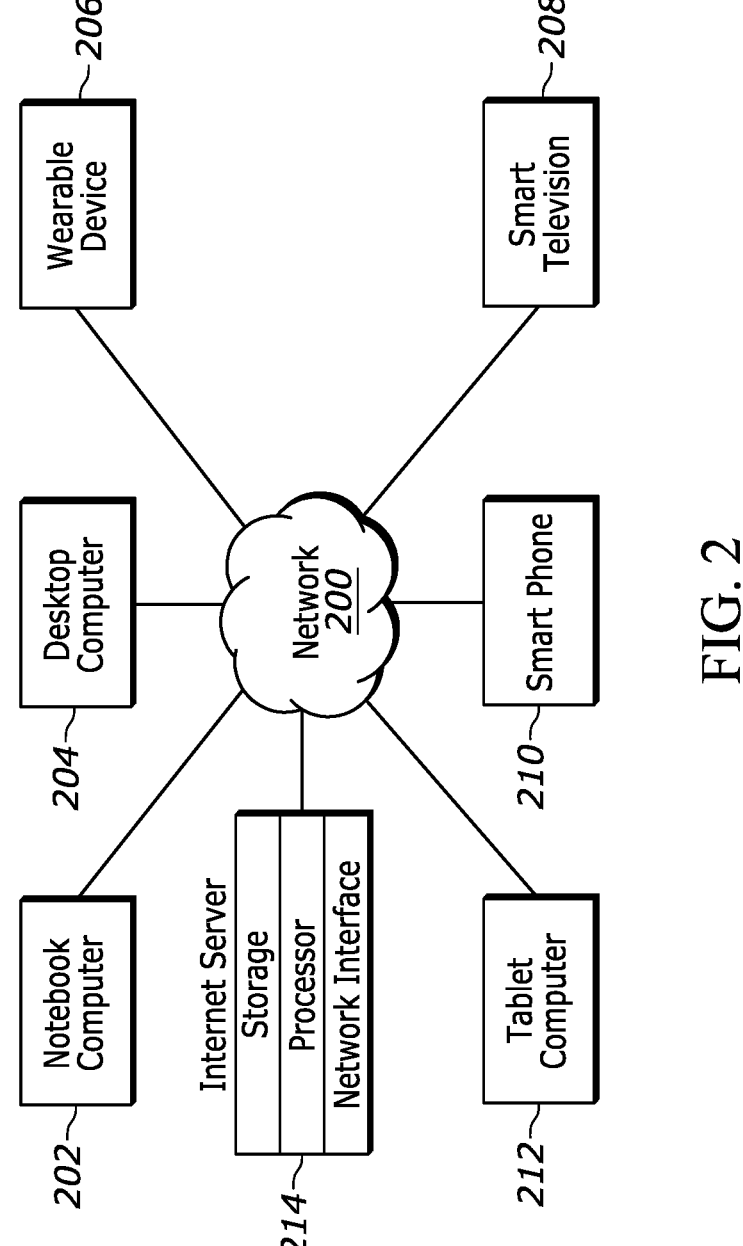
FIG. 2 is a block diagram of an example network of devices consistent with present principles.

Turning now to FIG. 2, example devices are shown communicating over a network 200 such as the Internet, a Bluetooth network, an ultra-wideband (UWB) network, etc. consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
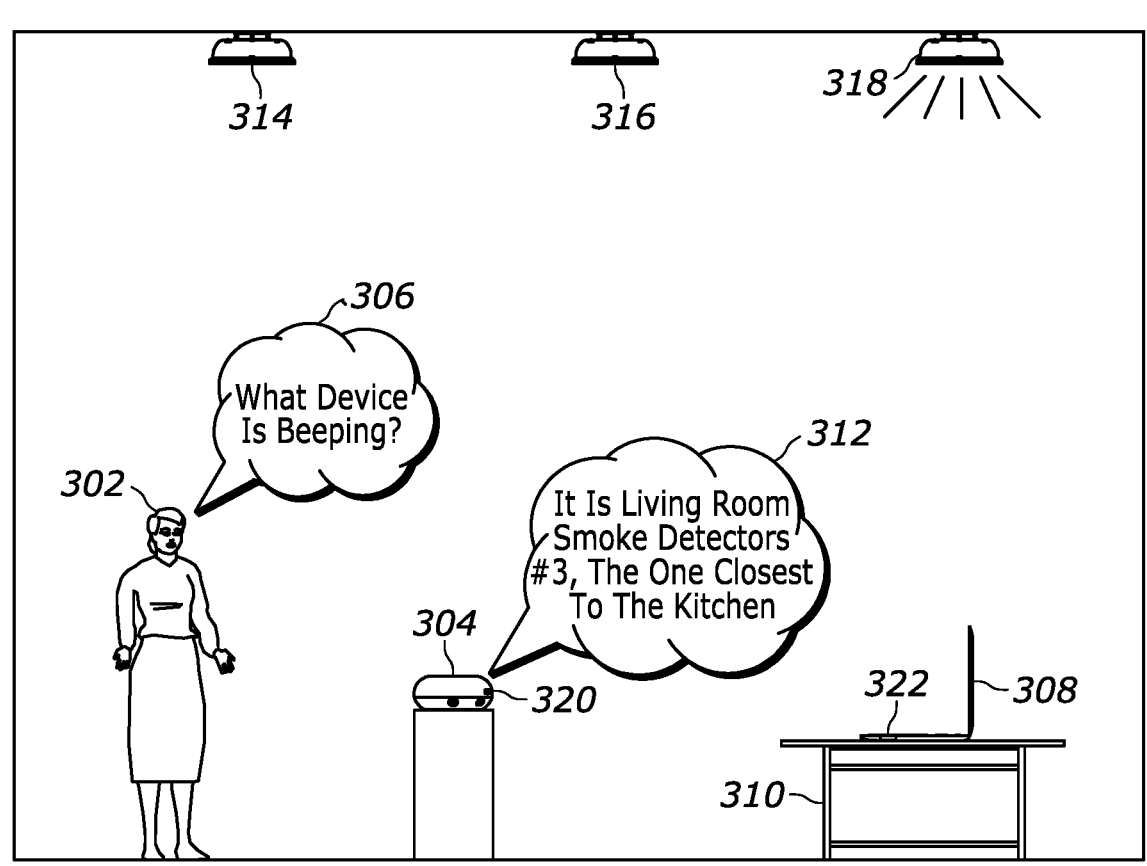
FIG. 3 shows an example illustration of a user interacting with one device to determine the identity and location of another device providing an audible notification consistent with present principles.

Now referring to FIG. 3, it shows an example illustration 300 consistent with present principles. Suppose an end-user 302 hears an audible notification such as a smoke alarm "beep" that a smoke detector typically begins periodically emitting once its battery reaches a low battery threshold to notify people that its battery should be changed to continue to function properly. The user 302 may trigger a voice assistant on a voice assistant device 304 such as a stand-alone digital assistant that has a voice assistant application (app) installed and executing (e.g., Google Nest device, Amazon dot, Amazon echo, Lenovo Smart Assistant, Apple HomePod Mini, etc.). However, the device may be another type as well, such as a laptop, smartphone, tablet, or other device type that also has a voice assistant app installed and executing. The voice assistant app itself may be Google's Assistant, Amazon's Alexa, Microsoft's Cortana, Lenovo Voice Pro, or Apple's Siri, for example.

In any case, to trigger the voice assistant, the user 302 might utter a wake-up word or phrase and then provide audible input 306 such as asking, "What device is beeping?" In response, a stand-alone device 304 or another device that picked up the voice input like the laptop 308 sitting on the desk 310 shown in FIG. 3 may provide an audible output 312. The output 312 may provide an answer to the user's question based on detection of a particular device that is providing the audible notification, where the audible output 312 indicates a location and/or one or more identifiers for the sound-emitting device itself. In the present example, the audible output 312 indicates that "It is living room smoke detector number three, the one closest to the kitchen" as a response to the audible input 306, which corresponds to smoke detector 318 (illustrated as emitting an audible notification via the lines emanating from the detector 318).

Thus, as may be appreciated from FIG. 3, while three smoke detectors 314, 316, and 318 are all located on various areas of the ceiling of the person's living room (the room depicted in FIG. 3), one or more directional microphones of respective microphone arrays 320, 322 on the devices 304, 308 may be used to triangulate the source of the sound indicated via the input 306 to identify which of the smoke detectors 314-318 is the one emitting the audible notification (again, detector 318 in this example). To do so, each device 304, 308 may determine a bearing to the source of the sound based on which of its directional microphones for its respective array picks up the audible notification the strongest (e.g., at the greatest volume) and hence use the bearing/axis of that respective directional microphone as the bearing to the source of the audible notification itself. The devices 304, 308 may then communicate with each other for one or more of them to perform triangulation to determine the location of the source of the audible notification based on the respective bearings to the source of sound as determined by each device as well as the known locations of the devices 304, 308 themselves (and hence a known distance between the two devices).

Accordingly, note that the locations of the devices 304, 308 may be established/known based on GPS coordinates from GPS transceivers on each device, ultra-wideband (UWB) location tracking using UWB transceivers on each device, Wi-Fi location tracking using Wi-Fi transceivers on each device (e.g., Wi-Fi positioning system (WPS)), camera input and computer vision, or other suitable means. Distance between the two devices 304, 308 may then be determined from the locations themselves, and/or may also be determined based on execution of a received signal strength indicator (RSSI) algorithm using signals between the two devices as well as other methods. Location relative to other rooms within the same building may be determined based on user input establishing the locations and dimensions of the respective rooms, access to a 3D spatial map of the building, access to a blueprint of the building, and/or IoT network information, etc.

Furthermore, note that even if the location of the sound-emitting device as determined through triangulation does not directly correspond to a known location of a potential device (e.g., the known locations of the detectors 314-318), which might occur if the bearing/axis of a respective directional microphone that hears the audible notification the loudest does not line up exactly with an actual bearing to the source of sound itself, the device emitting the audible notification may still be determined with a high degree of confidence through process of elimination and/or selecting a device that has a known location that is nearest to the location determined through triangulation.

Now describing FIG. 4, it shows an example graphical user interface (GUI) 400 that may be presented on a display accessible to a given smart device that has been triggered by the audible input 306 (e.g., the display of a user's paired smartphone, the display of the laptop 308 of FIG. 3, etc.). The GUI 400 may be provided as a visual output in addition to or in lieu of the audible output 312 described above.

As may be appreciated from FIG. 4, the GUI 400 indicates identifying information and location information 402 for the smoke detector that is determined to have produced the audible notification. The output shown in FIG. 4 may also include an indication 404 of an action to take in relation to the device detected as producing the audible notification. For example, the output device may access data on the Internet or in a manufacturer database to provide the indication 404. In the present example, the indication 404 indicates that the user should twist the smoke detector 318 counter-clockwise to remove it from the ceiling, then remove the battery compartment door on the back to access the battery compartment itself, and then change the smoke detector's battery to stop the smoke detector 318 from continuing to emit a low-battery audible notification.

Additionally, if desired the GUI 400 may include a selector 406. The selector 406 may be selected to command the output device to present a "how to" video demonstrating the instructions provided via the indication 404. For example, the output device may locate a video online such as via an Internet website (e.g., manufacturer website) or on YouTube that shows someone else performing the instructions, and then link to that video through the selector 406.

Before moving on to FIG. 5, note with respect to FIGS. 3 and 4 that any output/information provided visually (e.g., via the GUI 400) may also be provided audibly, and vice versa.

Now continuing the detailed description in reference to FIG. 5, it shows example logic that may be executed by a first device such as the system 100, one or both of the devices 304, 308, an IoT "hub device" or other local coordinating device in communication with other local devices such as the devices 304, 308, a remotely-located server in communication with local devices such as the devices 304, 308, and/or another type of device alone or in any appropriate combination consistent with present principles. However, for simplicity, the device(s) executing the logic of FIG. 5 will be described below as a device with its own microphone array that may be used to detect an audible notification. Further note that while the logic of FIG. 5 is shown in flow chart format, other suitable logic may also be used.

Beginning with block 500, the first device may receive input from one or more directional microphones on its own microphone array as well as input from one or more directional microphones on the microphone array of another device with which it communicates/knows its location to identify an audible notification and bearings to the other device that is producing the audible notification. Note that block 500 may be executed responsive to user command such as the audible input 306 described above, may be executed responsive to another trigger, or may be executed autonomously and/or proactively even prior to a user request.

From block 500 the logic may then proceed to block 502. At block 502 the first device may triangulate whatever device is producing the audible notification using its own location and bearing as well as the location and bearing of another device with which the first device is communicating for triangulation. For example, the first device may be the device 304 described above and may triangulate based on its own location and determined bearing to the sound source as well as the location and determined bearing to sound source for the laptop 308. But again, note that a device such as a user's smartphone or a remotely located server may also receive such information from each of the devices 304, 308 and perform triangulation on its own.

In any case, but also at block 502, note that in addition to or in lieu of triangulation the first device may also match the detected audible notification to one or more preregistered sounds to help identify the device emitting the audible notification. For example, the first device may access a database of registered sounds to match the detected sound to a registered sound. The database may have been created and maintained by a third party such as a device manufacturer but may also be created based on one or more end-users themselves registering sounds and providing identifying information. Various sound registration techniques that may be used consistent with present principles will be discussed in greater detail later.

However, first note that from block 502 the logic may then proceed to block 504. At block 504, if the first device has not already done so, it may receive user input requesting an identifier and/or location of whatever device the user hears emitting the audible notification. The user input may be audible input detected using a microphone or may be another type of input such as a command provided via a GUI presented on a touch-enabled display. For example, the user input may be audible input asking, "What device is making that noise?" or "Where is that sound coming from?"

From block 504 the logic may then move to block 506. At block 506 the first device may provide an output in response to the user input. Again, note that the output may include device identifiers such as device name and device type for the respective device determined to be emitting the audible notification, as well as other data such as the location of the emitting device and any actions to take to address the audible notification from the emitting device.

Figure 6:
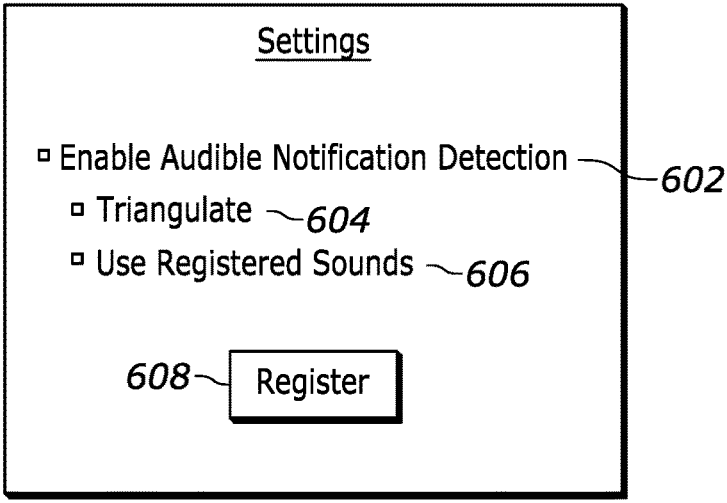
FIG. 6 shows an example GUI that may be presented to configure one or more settings of a device to operate consistent with present principles.

Now describing FIG. 6, it shows an example settings GUI 600 that may be presented on the display of a device configured to undertake present principles in order to set or enable one or more settings of the device to operate consistent with present principles. For example, the GUI 600 may be reached by navigating a settings menu of the device itself. Also note that in the example shown, each option or sub-option discussed below may be selected by directing touch or cursor input to the respective check box adjacent to the respective option.

As shown in FIG. 6, the GUI 600 may include an option 602 to set or configure the device to in the future perform the functions described herein, including receiving a user request to identify another device emitting an audible notification and providing an output in response. For example, the option 602 may be selected a single time to enable the device to, for multiple future instances, perform the functions of the device 304 or 308 described above, provide the output of the GUI 400, and/or execute the logic of FIG. 5.

The GUI 600 may also include sub-options 604, 606. Sub-option 604 may be selected to specifically set or enable the device to use triangulation to identify another device emitting an audible notification. Sub-option 606 may be selected to specifically set or enable the device to match the detected audible notification to one or more preregistered sounds consistent with present principles.

Still further, the GUI 600 may include a selector 608. The selector 608 may be selected to initiate an end-user based audible notification registration process to register an audible notification for a device to recognize it again in the future. Two example processes will be described in reference to FIGS. 7 and 8.

Figure 7:
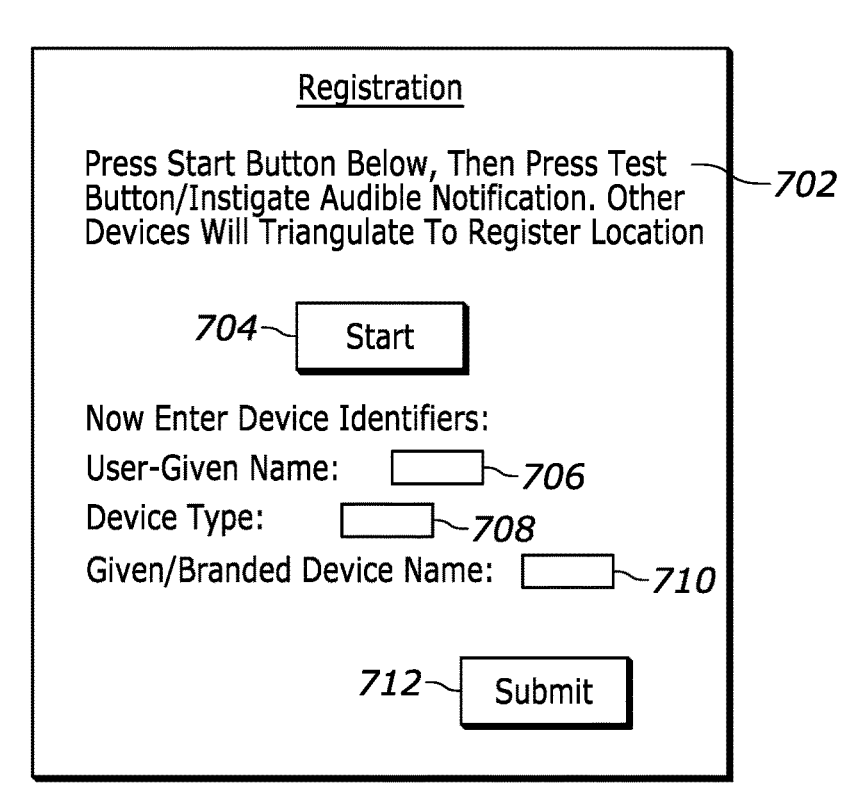

Beginning first with FIG. 7, it demonstrates a registration process where each sound-emitting device can be registered in part based on the end-user pressing the sound-emitting device's test button (e.g., in the case of a smoke detector or carbon monoxide detector) or otherwise instigating the sound-emitting device to produce the audible notification the user seeks to register. Thus, instructions 702 may be provided as part of a GUI 700, which itself may be presented responsive to selection of the selector 608 for example.

As shown in FIG. 7, the instructions 702 may instruct the user to select the start button 704 and then instigate the sound-emitting device to provide the audible notification the user is trying to register. The instructions 702 might also indicate, for example, that the sound-emitting device will be triangulated to register its location. Thus, the sound volume of the audible notification itself as well the location of the emitting device may be captured by other smart devices in the area for registration during this phase.

Afterwards, the user may provide identifying information for the sound-emitting device itself via the GUI 700. For example, the user may use a hard or soft keyboard to enter respective data into a respective input box 706, 708, and/or 710 to respectively specify a user-designated device name, a device type (e.g., smoke detector, carbon monoxide detector), and/or a given or manufacturer-provided device name. After that, the user may select the submit selector 712 to register the sound-emitting device (and/or audible notification itself) according to the location determined via triangulation and identifier information provided by the user.

FIG. 8 shows another example registration process. In this example, the end-user can manually input not only the identifier information but also a location for a given sound-emitting device that is to be registered. Accordingly, FIG. 8 shows a GUI 800 that may be used to do so and note again that the GUI 800 might be presented responsive to selection of the selector 608 from the GUI 600.

As shown, the GUI 800 may include a first input box 802 at which the user may enter a device type for the sound-emitting device. Likewise, in input box 804 may be used to enter a device name (e.g., unique, user-designated name or manufacturer-designated name). Input box 806 may be used to enter a serial number or other unique identifying information for the sound-emitting device itself. The serial number (or other identifier from the user) may be useful, for example, to access an appropriate database for the sound-emitting device to match a given audible notification that is detected via a microphone to a sound already associated with that sound-emitting device in the database itself.

Additionally, input may be entered into input box 808 to specify a location of the sound-emitting device that is being registered. The location may be expressed in GPS coordinates, room within a building such as office or personal residence, or even a particular area of a particular room or other space. Thus, even if the location of the sound-emitting device is not triangulated during registration, its location may be known based on the user input to box 808 to identify an audible notification as coming from it at a later time. For completeness, note that after information has been entered into one or more of the boxes 802-808, the user may select the submit selector 810 to register the sound-emitting device accordingly.

Continuing the detailed description in reference to FIG. 9, it shows another example GUI 900 that may be provided as an output responsive to a user request to identify a source of an audible notification. For example, the GUI 900 may be presented in lieu of the GUI 400 described above. For FIG. 9, assume the other device producing the audible notification has not been previously registered.

Based on the other device not being registered, the output may include an indication 902 that the sound-emitting device is not registered. But, owing to the audible notification still being triangulated using other devices, the location of the sound-emitting device may still be determined. In the present instance, the sound-emitting device has been determined to be located in a kitchen of a personal residence.

Thus, a location of the sound-emitting device may still be provided based on triangulation even absent registration as disclosed above. However, further note that in some examples the audible notification may nonetheless be matched to one or more predetermined/preregistered sounds even if the sound-emitting device was not itself registered by the end-user. In this case, the audible notification may have been preregistered into a database accessible online and created by a device manufacturer, developer, or other third party and may be associated in the database with one or more device identifiers for the device(s) that produce the registered sound. Thus, an estimate 904 provided on the GUI 900 may indicate that the audible notification sounds, in the present example, like a smoke detector alarm/beep or carbon monoxide alarm.

The foregoing may be particularly useful if, for example, the sound-emitting device has a unique audible notification that can be easily distinguished from other sounds. For example, an audible notification that is proprietary to a given manufacturer and/or given device may be easily distinguishable from other sounds. As another example, an audible notification that is proprietary or unique to a software app from a given developer may also be easily distinguishable from other sounds. Thus, the type of device and/or the unique notification itself may be identified even without an end-user themselves registering the sound locally.

Moving on from FIG. 9, note that depending on the size of a given microphone array, different directional microphones on a single microphone array may be used for triangulation as described herein where, e.g., the microphone array is large enough to still provide a desired level of triangulation accuracy despite the directional microphones still being located relatively close together.

It may now be appreciated that present principles provide for an improved computer-based user interface that increases the functionality and ease of use of the devices disclosed herein. For example, present techniques may be employed to address a situation with a device even when network communication is cut off or when network communication would accelerate battery drain and potentially exacerbate the problem. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
at least one processor; and
storage accessible to the at least one processor and comprising instructions executable by the at least one processor to:
detect an audible notification from a second device different from the first device;
subsequent to the detection of the audible notification, receive audible input from a user requesting information pertaining to the audible notification from the second device;
responsive to receipt of the audible input, determine whether the second device is a registered device;
based on a determination that the second device is a registered device, access registration data associated with the second device and present a first graphical user interface (GUI) on a display, the first GUI indicating the registration data and indicating instructions for how to stop recurrence of the audible notification, the first GUI further comprising a selector that is selectable to initiate presentation of a video on how to stop recurrence of the audible notification;
based on a determination that the second device is not a registered device, present a second GUI on the display, the second GUI being different from the first GUI, the second GUI indicating that the second device is not registered and also indicating estimated information about the second device.

2. The first device of claim 1, wherein the instructions are executable to:
present a third GUI on the display, the third GUI being different from the first and second GUIs, the third GUI comprising an option that is selectable to set the first device to, for multiple future instances, present respective GUIs comprising data related to respective detected audible notifications.

3. The first device of claim 2, wherein the third GUI comprises a selector to initiate a registration process to register a particular device for presentation of data related to audible notifications emitted by the particular device in the future.

4. The first device of claim 1, wherein the audible notification is a first audible notification, and wherein the instructions are executable to:
responsive to a third device emitting a second audible notification, initiate a registration process to register the third device for presentation of data related to audible notifications emitted by the third device in the future.

5. The first device of claim 4, wherein the third device is different from the second device.

6. The first device of claim 1, wherein the second GUI indicates estimated information determined using ultrawideband location tracking.

7. The first device of claim 1, wherein the second GUI indicates estimated information determined using a received signal strength indicator (RSSI) algorithm.

8. The first device of claim 1, comprising the display.

9. A method, comprising:

detecting, at a first device, an audible notification from a second device different from the first device;

subsequent to the detection of the audible notification, receiving audible input from a user requesting information pertaining to the audible notification from the second device;

responsive to receipt of the audible input, determining whether the second device is a registered device;

based on a determination that the second device is a registered device, accessing registration data associated with the second device and presenting a first graphical user interface (GUI) on a display, the first GUI indicating the registration data;

based on a determination that the second device is not a registered device, presenting a second GUI on the display, the second GUI being different from the first GUI, the second GUI indicating estimated information about the second device;

wherein one or more of:

the first GUI indicates instructions for how to stop recurrence of the audible notification; and/or the first GUI comprises a selector that is selectable to initiate presentation of a video on how to stop recurrence of the audible notification.

10. The method of claim 9, wherein the first GUI indicates the instructions for how to stop recurrence of the audible notification.

11. The method of claim 9, wherein the first GUI comprises the selector that is selectable to initiate the presentation of the video on how to stop recurrence of the audible notification.

12. The method of claim 9, comprising:

presenting a third GUI on the display, the third GUI being different from the first and second GUIs, the third GUI comprising an option that is selectable to set the first device to, for multiple future instances, present respective GUIs comprising data related to respective detected audible notifications.

13. The method of claim 9, wherein the audible notification is a first audible notification, and wherein the method comprises:

responsive to a third device emitting a second audible notification, initiating a registration process to register the third device for presentation of data related to audible notifications emitted by the third device in the future.

14. The method of claim 9, wherein the second GUI indicates estimated information determined using ultrawideband location tracking.

15. At least one computer readable storage medium (CRSM) that is not a transitory signal, the computer readable storage medium comprising instructions executable by at least one processor to:

detect, at a first device, an audible notification from a second device different from the first device;

subsequent to the detection of the audible notification, receive audible input from a user requesting information pertaining to the audible notification from the second device;

responsive to receipt of the audible input, determine whether the second device is a registered device;

based on a determination that the second device is a registered device, access registration data associated with the second device and present a first graphical user interface (GUI) on a display, the first GUI indicating the registration data;

based on a determination that the second device is not a registered device, present a second GUI on the display, the second GUI being different from the first GUI, the second GUI indicating estimated information about the second device;

wherein one or more of:

the first GUI indicates instructions for how to stop recurrence of the audible notification; and/or the first GUI comprises a selector that is selectable to initiate presentation of a video on how to stop recurrence of the audible notification.

16. The at least one CRSM of claim 15, wherein the first GUI indicates the instructions for how to stop recurrence of the audible notification.

17. The at least one CRSM of claim 15, wherein the first GUI comprises the selector that is selectable to initiate the presentation of the video on how to stop recurrence of the audible notification.

18. The at least one CRSM of claim 15, wherein the instructions are executable to:

present a third GUI on the display, the third GUI being different from the first and second GUIs, the third GUI comprising an option that is selectable to set the at least one processor to, for multiple future instances, present respective GUIs comprising data related to respective detected audible notifications.

19. The at least one CRSM of claim 15, wherein the audible notification is a first audible notification, and wherein the instructions are executable to:

responsive to a third device emitting a second audible notification, initiate a registration process to register the third device for presentation of data related to audible notifications emitted by the third device in the future.

20. The at least one CRSM of claim 15, wherein the second GUI indicates estimated information determined using ultrawideband location tracking.

* * * * *